(12) United States Patent
Wallgren (10) Patent No.: US 8,726,897 B2
(45) Date of Patent: May 20, 2014

(54) COLLAPSIBLE SOLAR MODULE SUPPORT SYSTEM AND METHOD FOR ASSEMBLING THE SAME

(75) Inventor: Linus Eric Wallgren, Bethesda, MD (US)

(73) Assignee: SunEdison, LLC, St. Peters, MO (US)

( * ) Notice: Subject to any disclaimer, the term of this patent is extended or adjusted under 35 U.S.C. 154(b) by 426 days.

(21) Appl. No.: 13/048,054

(22) Filed: Mar. 15, 2011

(65) Prior Publication Data
US 2012/0234310 A1  Sep. 20, 2012

(51) Int. Cl.
| F24J 2/46 | (2006.01) |
| B23P 19/04 | (2006.01) |
| A47G 19/08 | (2006.01) |
| E04D 13/18 | (2006.01) |
| H01L 31/042 | (2006.01) |

(52) U.S. Cl.
USPC ........... 126/571; 29/428; 211/41.1; 52/173.3; 136/244

(58) Field of Classification Search
USPC ........... 126/571; 29/428; 211/41.1; 52/173.3; 136/244
See application file for complete search history.

(56) References Cited

U.S. PATENT DOCUMENTS

| 2,828,805 | A | * | 4/1958 | Meldrum ...................... 108/119 |
| 4,226,256 | A |  | 10/1980 | Hawley |
| 4,421,943 | A |  | 12/1983 | Withjack |
| 4,466,424 | A |  | 8/1984 | Lockwood, Jr. |
| 4,886,554 | A |  | 12/1989 | Woodring et al. |
| 5,164,019 | A |  | 11/1992 | Sinton |
| 5,316,592 | A |  | 5/1994 | Dinwoodie |
| 6,148,570 | A |  | 11/2000 | Dinwoodie et al. |
| D453,727 | S |  | 2/2002 | Shugar et al. |
| 6,414,237 | B1 |  | 7/2002 | Boer |
| 6,443,145 | B1 |  | 9/2002 | Buron et al. |
| D468,684 | S |  | 1/2003 | Shugar |
| D469,057 | S |  | 1/2003 | Shugar |
| D469,058 | S |  | 1/2003 | Shugar |
| D471,855 | S |  | 3/2003 | Shugar et al. |
| 6,586,668 | B2 |  | 7/2003 | Shugar et al. |
| 6,702,370 | B2 |  | 3/2004 | Shugar et al. |
| 6,786,012 | B2 |  | 9/2004 | Bradley, Jr. |
| 6,809,251 | B2 |  | 10/2004 | Dinwoodie |

(Continued)

OTHER PUBLICATIONS

PCT International Search Report and Written Opinion of the International Searching Authority mailed on Jun. 20, 2012 regarding PCT/US2012/029046 filed on Mar. 14, 2012; 8 pages.

(Continued)

Primary Examiner — Kenneth Rinehart
Assistant Examiner — William Corboy
(74) Attorney, Agent, or Firm — Armstrong Teasdale LLP (57) ABSTRACT

A collapsible rack assembly for supporting a solar module and methods of assembling the same are provided. The assembly is movable from a collapsed position to an assembled position. The assembly comprises a plurality of collapsible frames, each of which comprises a first leg, a second leg, and a third leg. The first leg extends substantially parallel to a support surface. The second leg extends from the first leg at a first angle relative to the first leg when the frame is assembled and supports the solar module at the first angle when assembled. The third leg extends from the first leg at a second angle relative to the first leg when the frame is assembled. The second and third legs are rotatably connected to the first leg. When in the collapsed position the legs are nested so that one of the legs is disposed within another of the legs.

30 Claims, 8 Drawing Sheets (56) References Cited

U.S. PATENT DOCUMENTS

| | | |
|---|---|---|
| 6,883,290 B2 | 4/2005 | Dinwoodie |
| 6,930,238 B2 | 8/2005 | Makita et al. |
| 6,968,654 B2 | 11/2005 | Moulder et al. |
| 7,155,870 B2 | 1/2007 | Almy |
| 7,172,184 B2 | 2/2007 | Pavani et al. |
| 7,178,295 B2 | 2/2007 | Dinwoodie |
| 2002/0033436 A1* | 3/2002 | Peng et al. ............ 248/284.1 |
| 2004/0128923 A1 | 7/2004 | Moulder et al. |
| 2004/0139689 A1 | 7/2004 | Sinha et al. |
| 2005/0144870 A1 | 7/2005 | Dinwoodie |
| 2005/0199278 A1 | 9/2005 | Aschenbrenner |
| 2005/0268959 A1 | 12/2005 | Aschenbrenner et al. |
| 2006/0053706 A1 | 3/2006 | Russell |
| 2006/0196535 A1 | 9/2006 | Swanson et al. |
| 2006/0266405 A1 | 11/2006 | Lenox |
| 2008/0087275 A1 | 4/2008 | Sade et al. |
| 2008/0236571 A1 | 10/2008 | Keshner |
| 2010/0077679 A1 | 4/2010 | Sagayama |
| 2010/0186320 A1 | 7/2010 | Hoeft et al. |
| 2011/0047931 A1 | 3/2011 | Wallgren |
| 2012/0186632 A1* | 7/2012 | Reinhold et al. ............ 136/251 |

OTHER PUBLICATIONS

Madower et al., "Solar Opportunity Assessment Report," Presented by the Solar Catalyst Group (2003), www.solarcatalysts.com, 67 pages.

* cited by examiner

COLLAPSIBLE SOLAR MODULE SUPPORT SYSTEM AND METHOD FOR ASSEMBLING THE SAME

FIELD

This invention generally relates to systems for supporting a solar module on a support surface and, more specifically, to collapsible systems for supporting solar modules and methods for assembling such systems.

BACKGROUND

Solar modules are devices which convert solar energy into other forms of useful energy (e.g., electricity or thermal energy). Such modules are typically positioned above an underlying support surface by a rack. This rack may be configured to position the solar module at an angle relative to the support surface to minimize an angle of incidence between the solar module and the sun's rays. Minimizing this angle of incidence increases the amount of solar energy gathered by the solar module.

Previous racks are typically formed from a plurality of structural members. These members are most often assembled into a rack at a factory or other remote site and then transported to an installation location in this assembled state. Because of their size, the assembled racks can be relatively expensive to transport.

In other methods, the structural members are transported to an installation location and then assembled to form the racks on site. While this method reduces the costs of shipping the structural members to the installation site, additional time is required to assemble the racks on site. Moreover, relatively greater amounts of labor are required to assemble the racks on site compared to the labor required to assemble them in a factory.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF SUMMARY

One aspect is a collapsible rack assembly for supporting a solar module on a support surface. The assembly is movable from a collapsed position to an assembled position. The assembly comprises a plurality of collapsible frames. Each frame comprises a first leg, a second leg, and a third leg. The first leg extends substantially parallel to the support surface in a first direction. The second leg extends from the first leg at a first angle relative to the first leg when the frame is assembled. The second leg supports the solar module at the first angle relative to the support surface when the frame is assembled. The third leg extends from the first leg at a second angle relative to the first leg when the frame is assembled. The second leg and the third leg are rotatably coupled to the first leg such that when in the collapsed position the legs are nested so that one of the legs is disposed within another of the legs.

Another aspect is a system of rack assemblies for supporting a wind deflector and a solar module on a support surface. Each assembly comprises a plurality of frames and each frame comprises a first leg, a second leg, and a third leg. The first leg extends substantially parallel to the support surface in a first direction. The second leg extends from the first leg a first angle relative to the first leg when the frame is assembled. The second leg supports the solar module at the first angle relative to the support surface when the frame is assembled. The third leg extends from the first leg at a second angle relative to the first leg when the frame is assembled. The third leg supports the wind deflector at the second angle relative to the support surface when the frame is assembled. An intra row connector is coupled to at least one of the legs and is configured to couple one of the legs to a leg of another rack assembly.

Still another aspect is a method of assembling a collapsible rack assembly for supporting a solar module on a support surface. The rack assembly comprises a plurality of frames, each of which is movable from a collapsed position to an assembled position. Each frame comprises a first leg, a second leg, and a third leg. The second leg and the third leg are rotatably coupled to the first leg such that when in the collapsed position the legs are in a nested configuration. The method comprises rotating the second leg with respect to the first leg such that the second leg extends from the first leg at a first angle relative to the first leg. The third leg is rotated with respect to the first leg such that the third leg extends from the first leg at a second angle relative to the first leg. A portion of the second leg is attached to a portion of the third leg to secure the frame in the assembled position.

Yet another aspect is a method of assembling a collapsible rack assembly for supporting a solar module on a support surface. Each of the plurality of frames is movable from a collapsed position to an assembled position. Each frame comprises a first leg, a second leg, a third leg, and an intra row connector coupled at its first end to one of the legs. The second leg and the third leg are rotatably coupled to the first leg such that when in a collapsed position the legs are disposed in a nested configuration. The method comprises rotating the second leg with respect to the first leg such that the second leg extends from the first leg at a first angle relative to the first leg. The third leg is rotated with respect to the first leg such that the third leg extends from the first leg at a second angle relative to the first leg. A portion of the second leg is attached to a portion of the third leg to secure the frame in an assembled position. A second end of the intra row connector is attached to a leg of another frame of another rack assembly in an adjacent row.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

The drawings are not to scale and certain features may be exaggerated for ease of illustration.

Like reference symbols in the various drawings indicate like elements.

DETAILED DESCRIPTION

The systems and methods described herein are generally directed to a collapsible rack assembly for supporting a solar module on a support surface. The solar module in one embodiment is photovoltaic (PV) cell or array of such cells configured to convert solar energy into electricity via the photovoltaic effect. Other solar modules are contemplated as well, such as those that heat water or another medium with solar energy.

Figure 1:
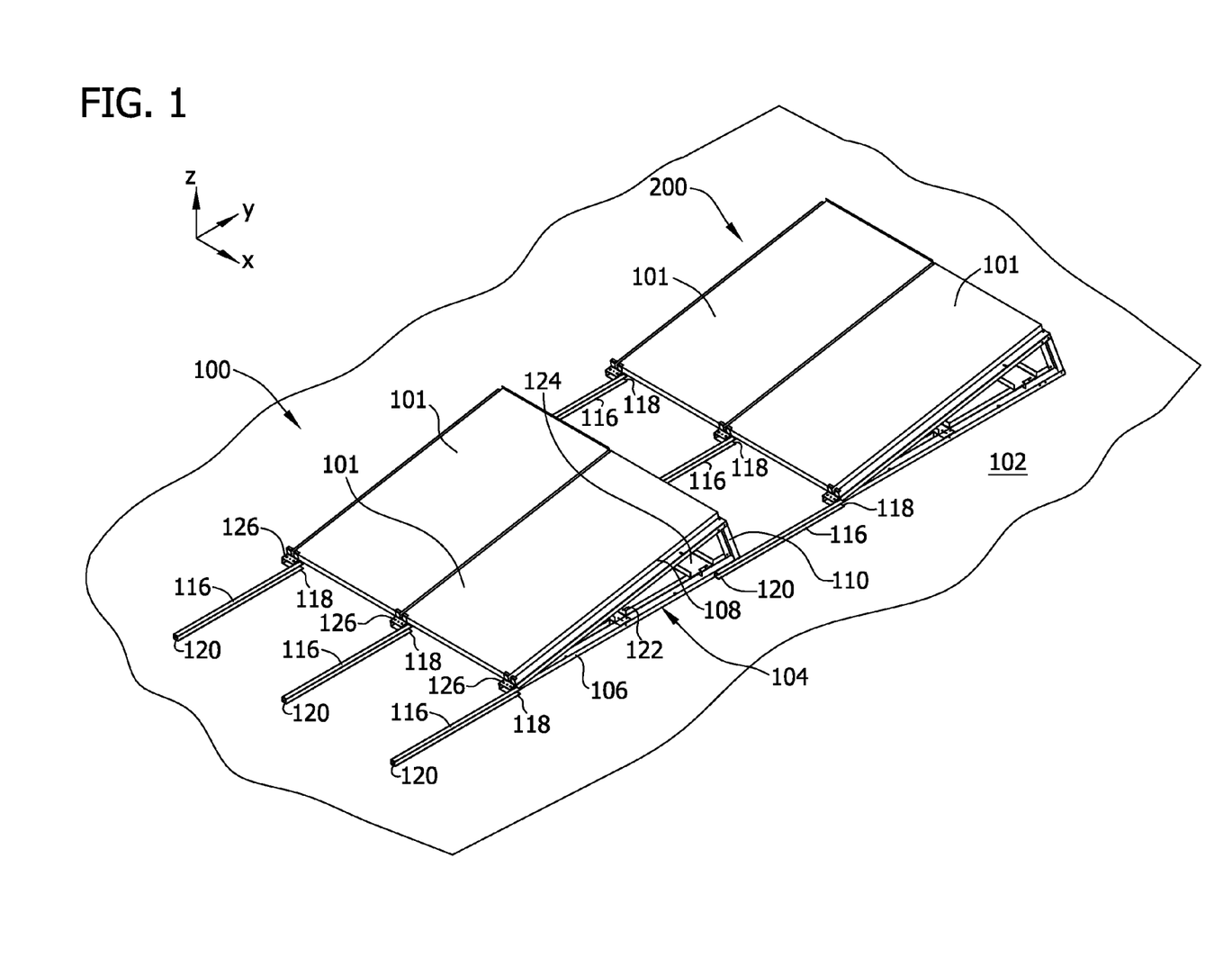
FIG. 1 is a perspective view of two collapsible rack assemblies for supporting solar modules.

Referring initially to FIG. 1, a rack assembly is indicated generally at 100 and supports a solar module 101. In the embodiment of FIG. 1, an additional rack assembly 200 is shown that is substantially similar or identical to rack assembly 100. Rack assembly 100 is discussed below in detail, and components and features described therein are the same in rack assembly 200 unless otherwise noted.

The rack assemblies 100, 200 in FIG. 1 are in adjacent rows. Rack assemblies 100, 200 extend in rows in a direction parallel to the x-axis shown in FIG. 1 while adjacent rows are spaced from each other in the direction of the y-axis. The rack assembly 100 is configured for placement on a support surface 102, such as a roof of a building or other structure. Alternatively, the rack assembly 100 can be placed on any fixed surface. Only a portion of the support surface 102 is shown in FIG. 1 and is omitted from the other Figures for clarity.

Figure 2:
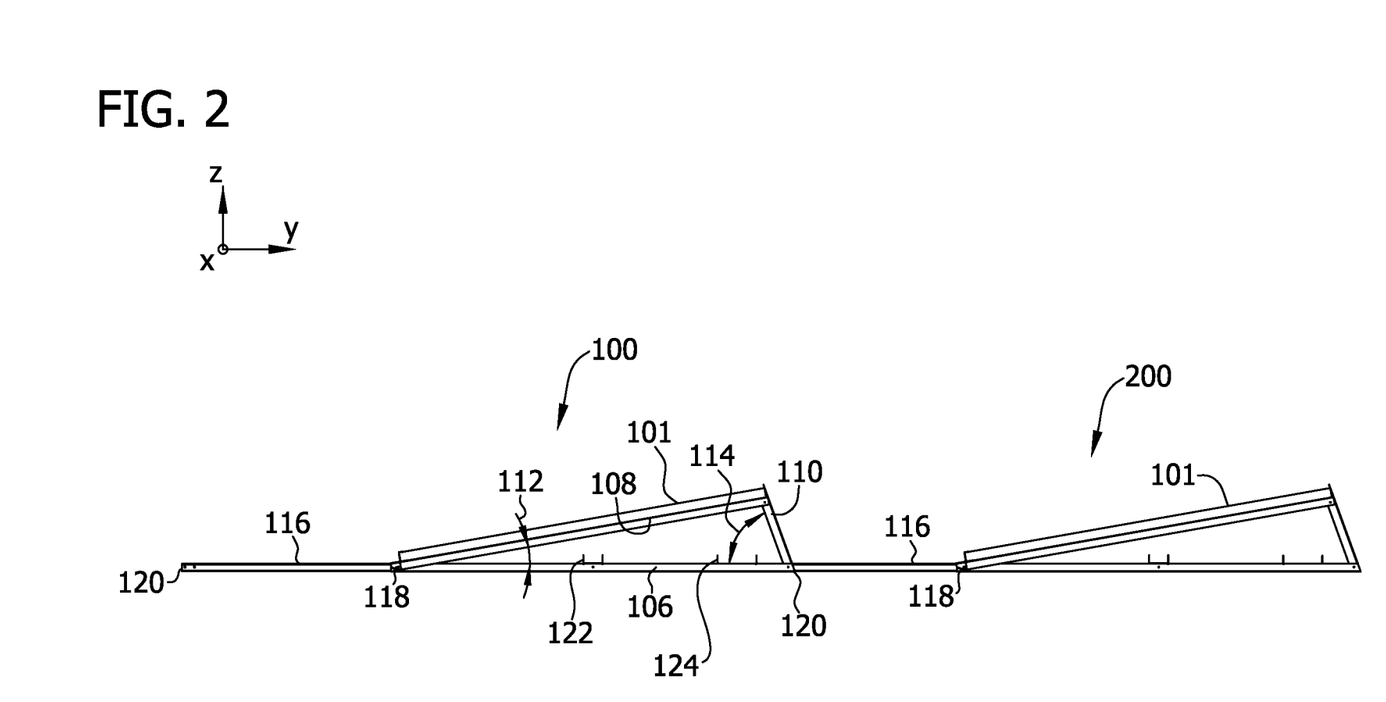
FIG. 2 is a side view of the rack assembly of FIG. 1.
Figure 4:
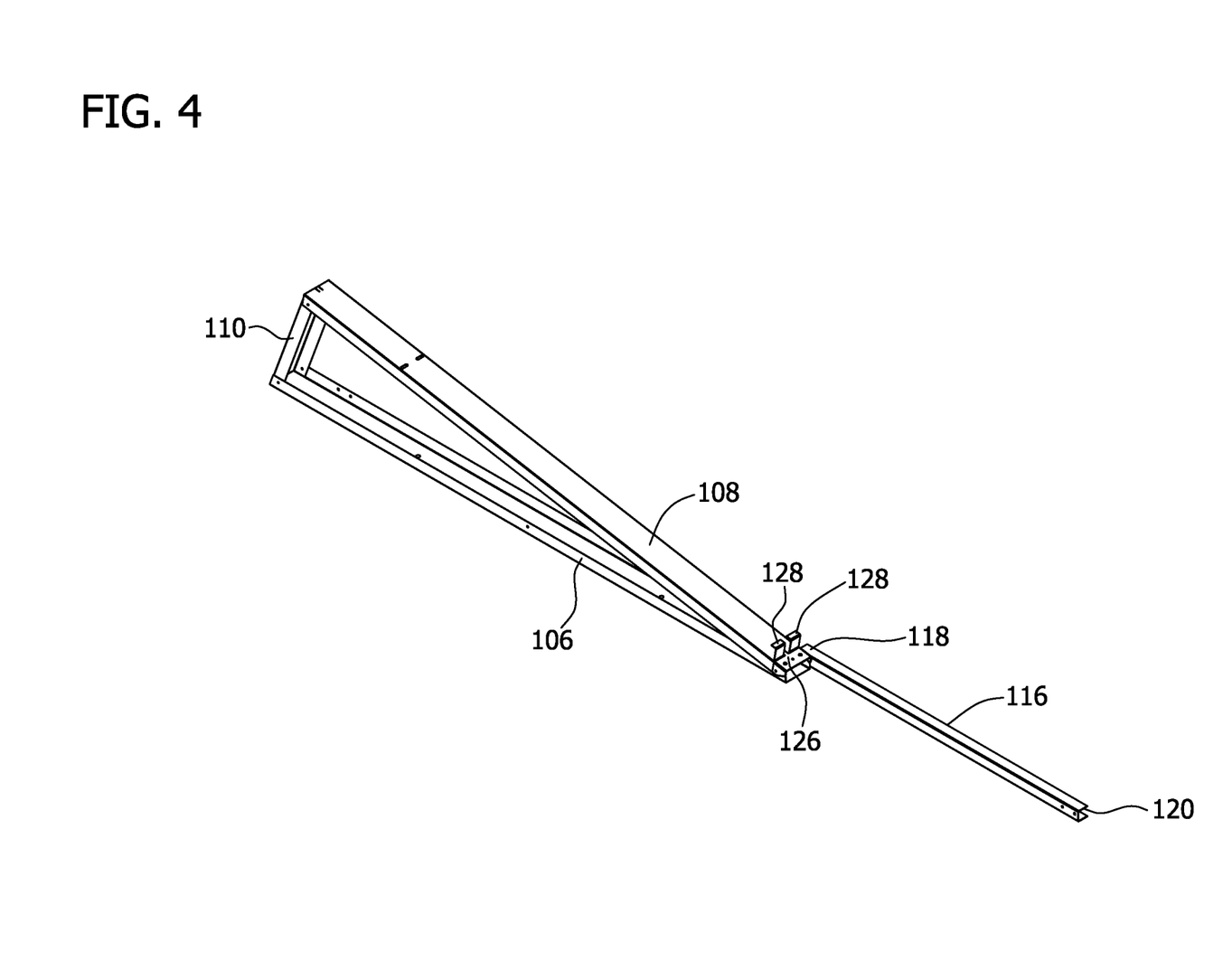
FIG. 4 is a perspective view of one of the frames of FIG. 1 in an assembled position.
Figure 5:
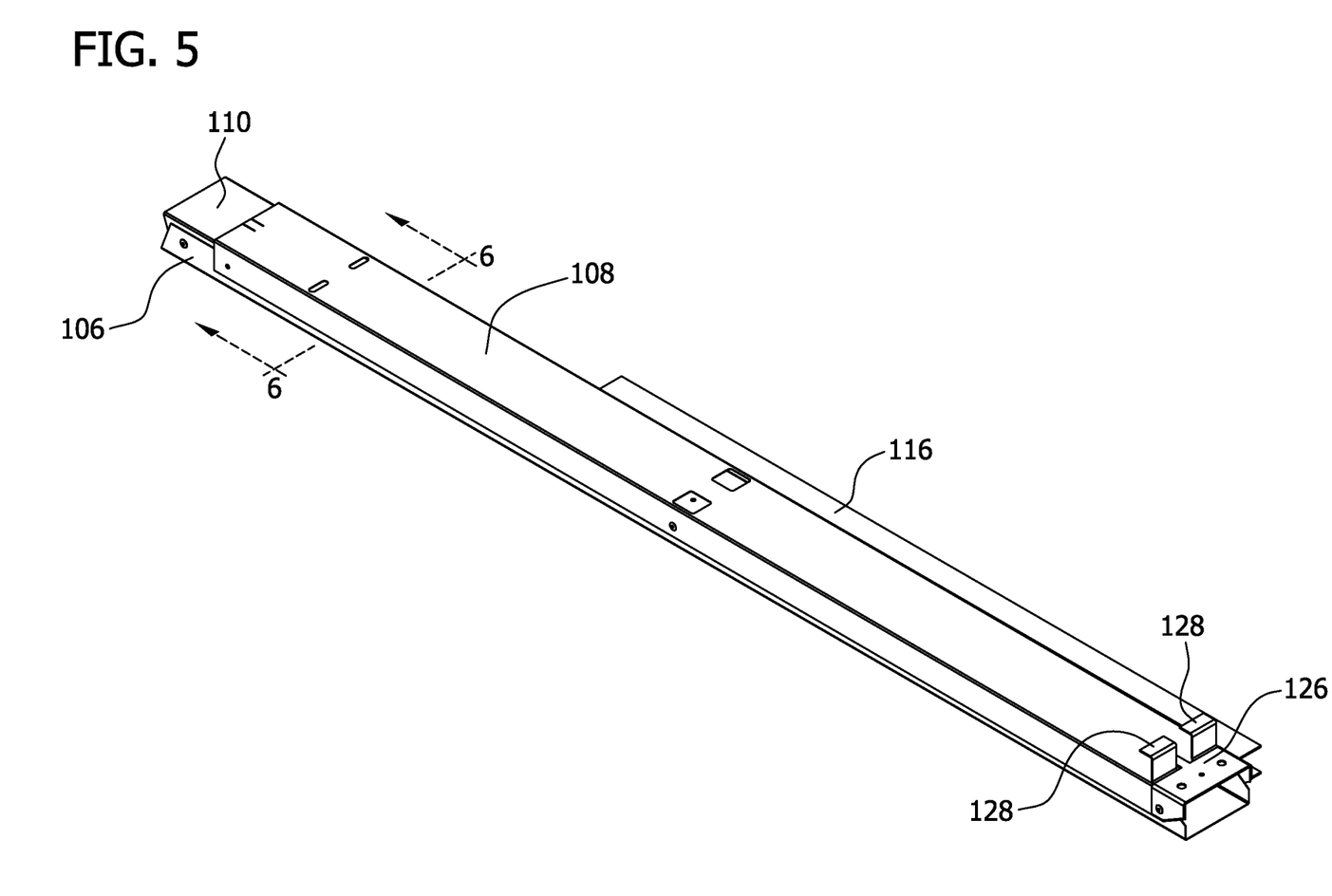
FIG. 5 is perspective view of the frame of FIG. 4 in a collapsed configuration.

The rack assembly 100 comprises a plurality of frames 104, one of which is shown in greater detail in FIGS. 2, 4 and 5. Each of the frames 104 in the rack assembly 100 is substantially the same as or similar to the other frames in the assembly. The frame 104 is movable from a collapsed position (shown in FIG. 5) to an assembled position (shown in FIG. 4). In the example embodiment, each rack assembly 100 includes three collapsible frames 104, while other embodiments may use more or fewer frames.

As shown in FIGS. 1 and 2, the frame 104 includes a first leg 106, a second leg 108, and a third leg 110. The first leg 106 extends substantially parallel to the support surface 102 in a first direction generally parallel to the y-axis. One or more pads (not shown) may be affixed to an underside of the first leg 106 to prevent abrasion of the support surface 102 by the first leg. The pads also prevent or eliminate movement of the first leg 106 (and hence the rack assembly) relative to the support surface 102. The pads may be formed from any suitable material that has a sufficiently high coefficient of friction (e.g., similar to that of rubber) and that will not abrade or otherwise damage the support surface 102.

The second leg 108 extends from the first leg 106 at a first angle 112 relative to the first leg when the frame 104 is in the assembled position. The second leg 108 supports the solar module 101 at the first angle 112 relative to the support surface 102 when the frame 104 is assembled. The third leg 110 extends from the first leg 106 at a second angle 114 relative to the first leg when the frame 104 is assembled.

The second leg 108 and the third leg 110 are rotatably connected at one of their respective ends to the first leg 106 such that, when in the collapsed position, the legs are nested so that one of the legs is disposed within another of the legs. The second leg 108 and third leg 110 are rotatably connected to the first leg 106 by rivets in this embodiment. In other embodiments, any suitable mechanical fastener can be used that permits the second leg 108 and the third leg 110 to rotate with respect to the first leg 106.

Figure 6:
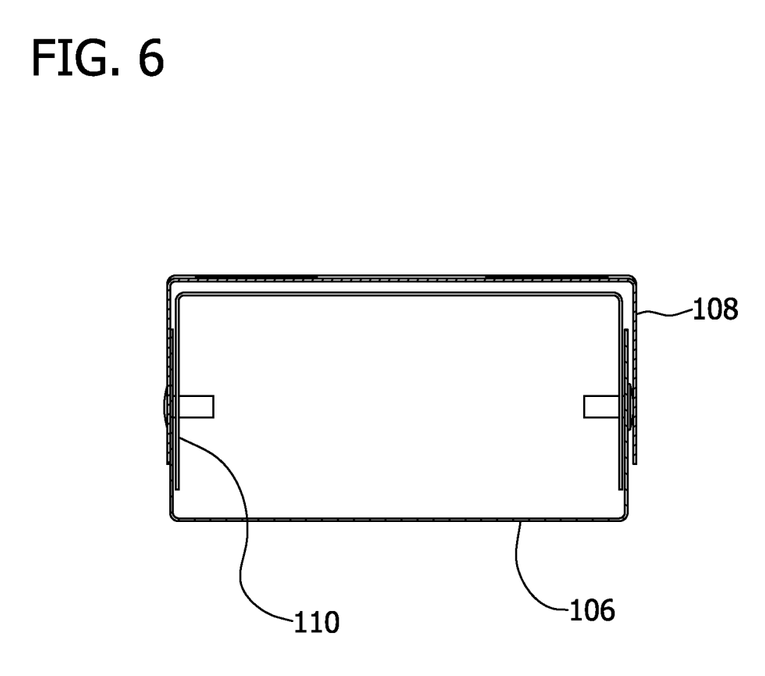
FIG. 6 is a cross-sectional view of FIG. 5 taken along the 6-6 line.

As shown in the cross-sectional view of FIG. 6, the second leg 108 and third leg 110 are sized such that when in the collapsed position, the third leg can nest within the first leg 106. The first leg 106 and the third leg 110 then nest within the second leg 108. As such, the first leg 106 and third leg 110 have a width that is less than a width of the second leg 108. Moreover, the third leg 110 has a width that is less than the first leg 106 in the example embodiment. In other embodiments, different legs may nest within each other. For example, the second leg 108 may nest within the first leg 106 and the first leg may nest within the third leg 110.

In the example embodiment, the legs 106, 108, 110 have a C-shaped cross-section although in other embodiments they may be shaped differently. For example, the legs 106, 108, 110 may be L-shaped, or otherwise shaped such that at least one of the legs can nest within another. The legs 106, 108, 110 are formed from any suitable material, such as, roll-formed sheet metal (e.g., cold-rolled sheet steel). Moreover, the legs 106, 108, 110 may be coated with or formed from corrosion-resistant materials. Examples of such materials include galvanized steel or stainless steel. Other embodiments may use legs constructed from composite materials.

An intra row connector 116 is shown in FIGS. 1, 2, 4, and 5 and has a first end 118 and a second end 120. The first end 118 is connected to the first leg 106 of one frame 104 while the second end 120 is connected to the first leg of a frame in an adjacent row. The intra row connector 116 thus connects the frame 104 to another frame in an adjacent row. In the example embodiment, the intra row connector 116 is connected to the first legs of frames in adjacent rows. In other embodiments, the intra row connector 116 may be connected to different legs of frames in adjacent rows.

The intra row connector 116 in the example embodiment has a plurality of openings (not shown) formed therein through which mechanical fasteners are inserted. The fasteners in turn are used to connect the intra row connector 116 to the legs of frames in adjacent rows. The intra row connector 116 is shaped similarly to or the same as the legs 106, 108, 110 in the example embodiment and has a C-shaped cross-section in this embodiment. In other embodiments, the intra row connector may 116 have a different cross-section (e.g., L-shaped). The intra row connector 116 is also formed from the same or similar materials as the legs 106, 108, 110. In other embodiments, the intra row connector 116 can be formed from different materials than the legs 106, 108, 110.

A ballast tray 122 (FIGS. 1 and 2) is connected to each of the first legs 106 of the plurality of collapsible frames 104 in a row of the frames. The ballast tray 122 is connected to the first legs 106 after the frames have been assembled with suitable mechanical fasteners. The ballast tray 122 is configured to receive ballast therein and has a C-shaped cross-section in this embodiment. The ballast received within the tray 122 is any suitable material of large enough mass to aid in restricting movement of the frame 104. For example, the ballast may be bricks, concrete blocks, rocks, etc.

An auxiliary ballast tray 124 is also connected to each of the first legs 106 of the plurality of collapsible frame 104 in a row of the frames. In the embodiment of FIG. 1, the auxiliary ballast tray 124 is connected to the first legs 106 between the ballast tray 122 and the third leg 110. The auxiliary ballast tray 124 has a shape similar to or the same as the ballast tray 122 and is formed from similar materials. In the example embodiment, the auxiliary ballast tray 124 has a wider cross-section than the ballast tray 122 and as such is able to receive more ballast than the ballast tray.

A clip 126 (FIGS. 1, 4, and 5) is connected to the second leg 108 with any suitable mechanical fastener in the example embodiment. The clip 126 has a pair of protrusions 128 for receiving the solar module 101 and connecting the solar module to the second leg 108. Additional mechanical fasteners may be used to connect the solar module 101 to the frame 104.

Figures 3A, 3B:
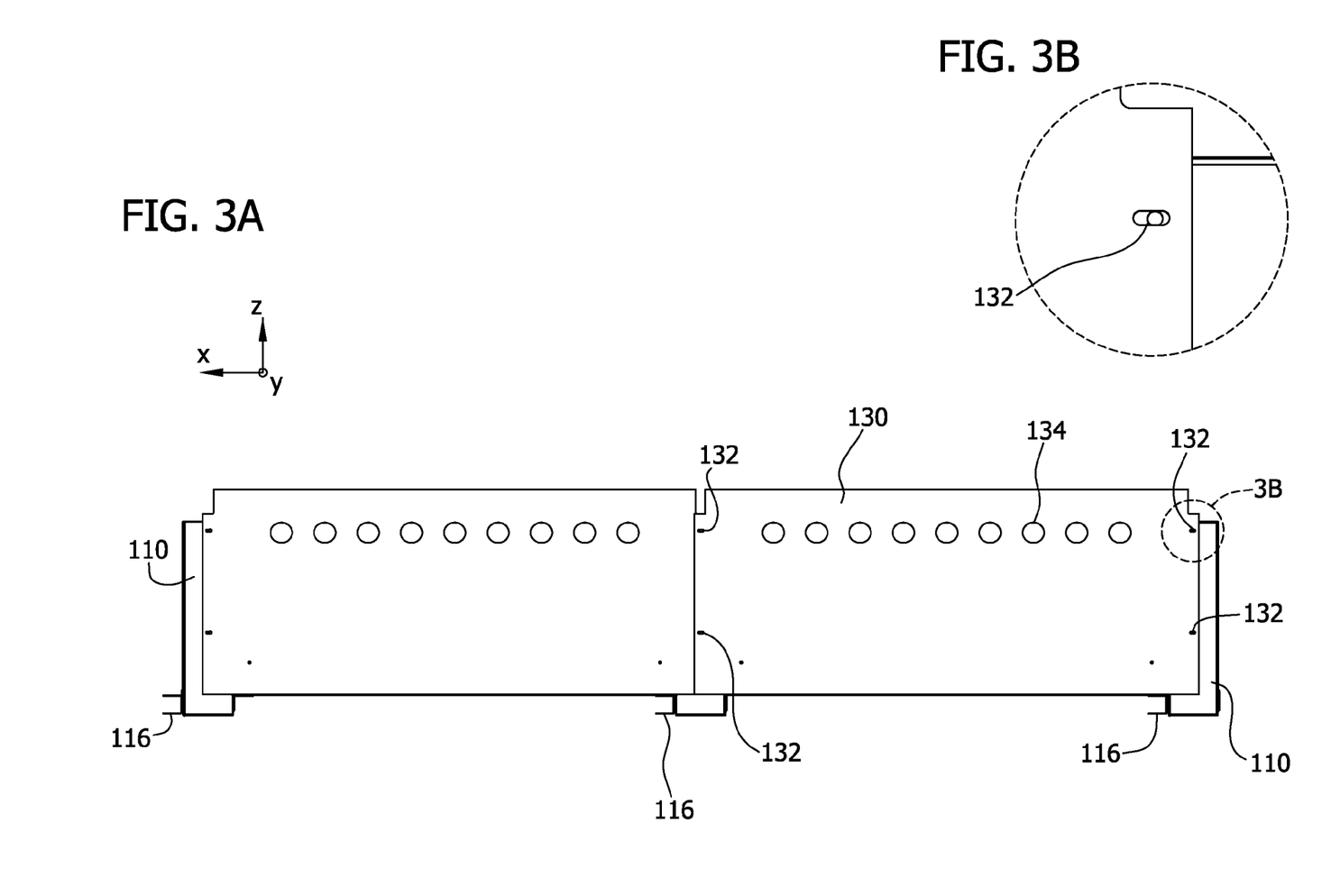
FIG. 3A is an end view of one of the rack assemblies of FIG. 1.
FIG. 3B is an enlarged portion of FIG. 3A.

A wind deflector 130 (FIGS. 3A and 3B) is connected to the third leg 110 for preventing wind from blowing against the underside of the solar module 101. In the embodiment of FIG. 3A, the wind deflector 130 spans two adjacent frames 104 in the same row. In other embodiments, the wind deflector 130 may be wider and span more than two frames 104.

The third leg 110 supports the wind deflector 130 at the same second angle 114 at which the third leg extends from the first leg 106. Any suitable mechanical fastener is used to connect the wind deflector 130 to the third leg 110. A plurality of vent openings 134 are formed in the wind deflector to allow for circulation of a limited amount of air between the support surface 102 and solar module 101.

A plurality of obround openings 132 (one of which is shown in detail in FIG. 3B) are formed in the wind deflector 130 and are to receive the mechanical fasteners. The obround shape of the openings 132 permits the position of the wind deflector 130 to be adjusted relative to the third leg 110. This adjustment of the wind deflector 130 allows a single wind deflector to span between multiple frames that may vary in relative height because of variations in the height of the support surface 102.

Figure 7:
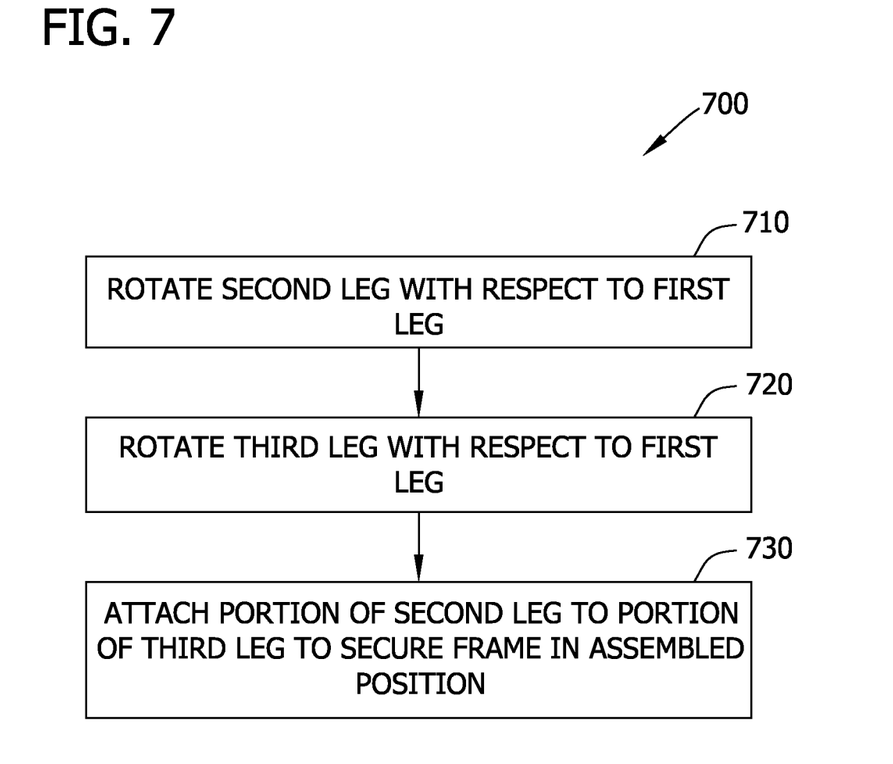
FIG. 7 is a flow diagram depicting a method for assembling the collapsible rack assemblies of FIG. 1.

FIG. 7 depicts a method 700 of assembling the rack assembly 100 and frame 104 described above. The method 700 begins with the frame 104 in the collapsed configuration shown in FIG. 5. The frame 104 may be placed atop the support surface 102 in this collapsed configuration. Alternatively, the frame 104 may be placed atop the support surface 102 in the assembled position after completion of the method 700.

In step 710 the second leg 108 is rotated with respect to the first leg 106 such that the second leg extends from the first leg at the first angle 112 relative to the first leg. In the example embodiment, the second leg 108 is rotated in a counter-clockwise direction from the perspective of FIGS. 4 and 5. The second leg 108 is rotated by a user or other suitable mechanical device.

The third leg 110 is then rotated in step 720 with respect to the first leg 106 such that the third leg extends from the first leg at the second angle 114 relative to the first leg. The third leg 110 is rotated in a clockwise direction from the perspective of FIGS. 4 and 5. Like the second leg 108, the third leg 110 is rotated by a user or other suitable mechanical device. The order of execution of steps 710 and 720 may be reversed in some embodiments based on the nested configuration of the second leg 108 and the third leg 110.

A portion of the second leg 108 adjacent one of its ends is then attached to a portion of the third leg 110 adjacent one of its ends in step 730. This attachment secures the frame 104 in the assembled position shown in FIG. 4. In the example embodiment, the portions of the second leg 108 and the third leg 110 are attached together with a suitable mechanical fastener. Other fastening systems may be used as well. For example, the respective portions of the second leg 108 and the third leg 110 may be sized such that they are secured together by an interference fit. Moreover, one or both of the respective portions may include tabs or other structures (not shown) that are bent once the frame is assembled to secure the portions together in the assembled position.

After the attachment of the second leg 108 to the third leg 110 in step 730, additional frames can be assembled according to the same or similar steps described above. The solar module 101 can then be placed atop the assembled frames 104 and secured to the frames with the clips 126 described above. Additional mechanical fasteners can also be used to secure the solar module 101 to the frame 104. Moreover, the ballast tray 122 and/or auxiliary ballast tray 124 may be connected to the first legs 106 of frames 104 in the same row. This may be done either before or after the solar module 101 is placed atop the assembled frames 104. Ballast can than be placed in the trays 122, 124.

Figure 8:
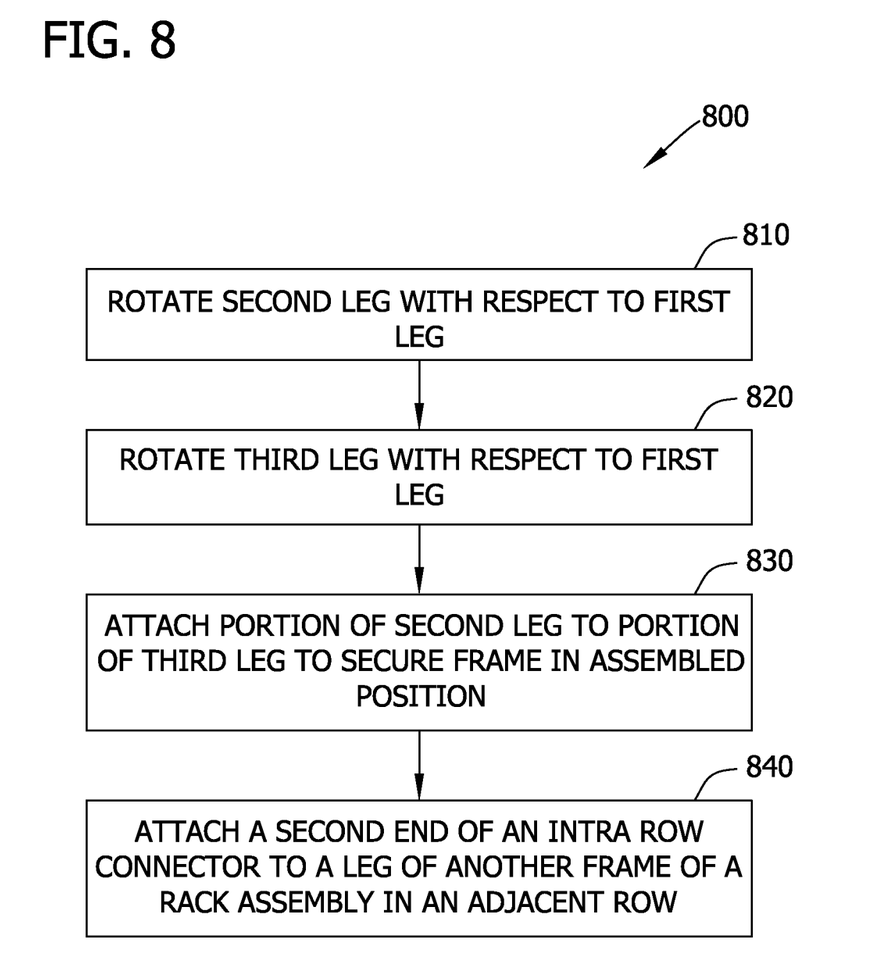
FIG. 8 is a flow diagram depicting another method for assembling the collapsible rack assemblies of FIG. 1.

FIG. 8 depicts a method 800 of assembling the rack assembly 100 and frame 104 described above. The method 800 is similar to the method 700, however an additional step is performed where the intra row connector 116 is connected to the leg of a frame in an adjacent row. The method 800 begins with the frame 104 in the collapsed configuration shown in FIG. 5. As shown in FIG. 5, the intra row connector 116 is connected to the first leg 106 with any suitable mechanical fastener. The frame 104 may be placed atop the support surface 102 in this collapsed configuration or, alternatively, it may be placed on the support surface after the method 700 is completed.

In step 810 the second leg 108 is rotated with respect to the first leg 106 such that the second leg extends from the first leg at the first angle 112 relative to the first leg. The third leg 110 is then rotated in step 820 with respect to the first leg 106 such that the third legs extends from the first leg at the second angle relative 114 to the first leg. The order of execution of steps 810 and 820 may be reversed in some embodiments based on the nested configuration of the second leg 108 and the third leg 110.

A portion of the second leg 108 is then attached to a portion of the third leg 110 in step 830. This attachment secures the frame 104 in the assembled position shown in FIG. 4, as described above.

After the attachment of the second leg 108 to the third leg 110 in step 830, additional frames can be assembled according to the same or similar steps described above. In step 840, the second end 120 of the intra row connector 116 connected to the frame assembled in steps 810-830 is connected to a leg of another frame of another rack assembly in an adjacent row. In the example embodiment, the second end 120 of the intra row connector 116 is connected to the first leg 106 of a frame 104 in an adjacent row. In other embodiments, the second end 120 is connected to the second leg 108 and/or third leg 110 of a frame in an adjacent row. In still other embodiments, the second end 120 is connected to the first leg 106 and second leg 108 or the first leg and third leg 110 of the frame.

The solar module 101 may be placed atop the assembled frames 104 and secured to the frames with the clips 126 described above. Additional mechanical fasteners can also be used to secure the solar module 101 to the frame 104. Alternatively, the solar module 101 can be placed atop the assembled frames 104 prior to connection of the intra row connector 116 to a frame in an adjacent row.

Moreover, the ballast tray 122 and/or auxiliary ballast tray 124 may be connected to the first legs 106 of frames 104 in the same row. This may be done either before or after the solar module 101 is placed atop the assembled frames 104. Ballast can than be placed in the trays 122, 124.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description and shown in the accompanying drawings shall be interpreted as illustrative and not in a limiting sense.

What is claimed is:

1. A collapsible rack assembly for supporting a solar module on a support surface, the assembly movable from a collapsed position to an assembled position, the assembly comprising:
    a plurality of collapsible frames, each frame comprising:
        a first leg extending substantially parallel to the support surface in a first direction;
        a second leg extending from the first leg at a first angle relative to the first leg when the frame is assembled, the second leg supporting the solar module at the first angle relative to the support surface when the frame is assembled; and
        a third leg extending from the first leg at a second angle relative to the first leg when the frame is assembled, the second leg and third leg rotatably connected to the first leg such that when in the collapsed position the legs are nested so that one of the legs is disposed within another of the legs.

2. The assembly of claim 1 further comprising an intra row connector connected to the first leg and configured to connect the frame to another frame in an adjacent row.

3. The assembly of claim 1 further comprising a ballast tray connected to each of the first legs of the plurality of collapsible frames when the plurality of collapsible frames is in the assembled position.

4. The assembly of claim 3 further comprising an auxiliary ballast tray connected to the first legs of each of the plurality of collapsible frames when the plurality of collapsible frames is in the assembled position.

5. The assembly of claim 1 wherein the third leg is nested within the first leg in the collapsed position.

6. The assembly of claim 5 wherein the first and third legs are nested within the second leg in the collapsed position.

7. The assembly of claim 1 further comprising a wind deflector connected to the assembly.

8. The assembly of claim 7 wherein the third leg supports the wind deflector at the second angle relative to the support surface when the frame is assembled.

9. The assembly of claim 7 further comprising a plurality of obround openings formed in the wind deflector, the plurality of obround openings sized to receive a mechanical fastener for coupling the wind deflector to at least one of the legs of the frame.

10. Rack assemblies for supporting a wind deflector and a solar module on a support surface, each assembly comprising:
    a plurality of frames, each frame comprising:
        a first leg extending substantially parallel to the support surface in a first direction;
        a second leg extending from the first leg a first angle relative to the first leg when the frame is assembled, the second leg supporting the solar module at the first angle relative to the support surface when the frame is assembled; and
        a third leg extending from the first leg at a second angle relative to the first leg when the frame is assembled, the third leg supporting the wind deflector at the second angle relative to the support surface when the frame is assembled; and
        an intra row connector connected to at least one of the legs and configured to connect one of the legs to a leg of another rack assembly.

11. The assembly of claim 10 further comprising a ballast tray connected to each of the first legs of the plurality of collapsible frames when the plurality of collapsible frames is in the assembled position.

12. The assembly of claim 11 further comprising an auxiliary ballast tray connected to the first legs of each of the plurality of collapsible frames when the plurality of collapsible frames is in the assembled position.

13. The assemblies of claim 10 wherein each rack assembly is movable from a collapsed position to an assembled position, the second leg and the third leg being rotatably connected to the first leg such that when in a collapsed position the legs are nested so that one of the legs is disposed within another of the legs.

14. The assembly of claim 13 wherein the third leg is nested within the first leg in the collapsed position.

15. The assembly of claim 14 wherein the first and third legs are nested within the second leg in the collapsed position.

16. The assembly of claim 10 further comprising the wind deflector connected to the rack assemblies.

17. The assembly of claim 16 wherein the third leg supports the wind deflector at the second angle relative to the support surface.

18. The assembly of claim 17 further comprising a plurality of obround openings formed in the wind deflector, the plurality of obround openings sized to receive a mechanical fastener for coupling the wind deflector to the third leg.

19. The assembly of claim 10 further comprising a clip for coupling the solar module to the second leg, the clip connected to the second leg of the frame.

20. A method of assembling a collapsible rack assembly for supporting a solar module on a support surface, the rack assembly comprising a plurality of frames movable from a collapsed position to an assembled position, each frame comprising a first leg, a second leg, and a third leg, the second leg and the third leg rotatably connected to the first leg such that when in the collapsed position the legs are in a nested configuration, the method comprising:
    rotating the second leg with respect to the first leg such that the second leg extends from the first leg at a first angle relative to the first leg;
    rotating the third leg with respect to the first leg such that the third leg extends from the first leg at a second angle relative to the first leg; and
    attaching a portion of the second leg to a portion of the third leg to secure the frame in the assembled position.

21. The method of claim 20 further comprising attaching a ballast tray to each of the first legs of the plurality of collapsible frames.

22. The method of claim 21 further comprising attaching an auxiliary ballast tray to the each of the first legs the plurality of collapsible frames.

23. The method of claim 20 wherein the attaching step includes riveting the second leg to the third leg to secure the frame in the assembled position.

24. The method of claim 23 further comprising positioning the frame in the assembled position atop the support surface.

25. The method of claim 23 further comprising positioning the frame in the collapsed position atop the support surface prior to assembling the frame.

26. A method of assembling a collapsible rack assembly for supporting a solar module on a support surface, each of the plurality of frames movable from a collapsed position to an assembled position, each frame comprising a first leg, a second leg, a third leg, and an intra row connector connected at a first end to one of the legs, the second leg and the third leg rotatably connected to the first leg such that when in a collapsed position the legs are disposed in a nested configuration, the method comprising:

rotating the second leg with respect to the first leg such that the second leg extends from the first leg at a first angle relative to the first leg;

rotating the third leg with respect to the first leg such that the third leg extends from the first leg at a second angle relative to the first leg;

attaching a portion of the second leg to a portion of the third leg to secure the frame in an assembled position; and attaching a second end of the intra row connector to a leg of another frame of another rack assembly in an adjacent row.

27. The method of claim 26 further comprising attaching a ballast tray to each of the first legs of the plurality of collapsible frames in a row.

28. The method of claim 27 further comprising attaching an auxiliary ballast tray to the first legs of each of the plurality of collapsible frames in the row.

29. The method of claim 26 further comprising positioning the frame in the assembled position atop the support surface.

30. The method of claim 29 further comprising positioning the frame in the collapsed position atop the support surface prior to assembling the frame.

\* \* \* \* \*